United States Patent [19]

Amatucci et al.

[11] Patent Number: 5,705,291
[45] Date of Patent: Jan. 6, 1998

[54] RECHARGEABLE BATTERY CELL HAVING SURFACE-TREATED LITHIATED INTERCALATION POSITIVE ELECTRODE

[75] Inventors: Glenn G. Amatucci, Raritan; Jean-Marie Tarascon, Martinsville, both of N.J.

[73] Assignee: Bell Communications Research, Inc., Morristown, N.J.

[21] Appl. No.: 630,807

[22] Filed: Apr. 10, 1996

[51] Int. Cl.[6] .................................................. H01M 4/62
[52] U.S. Cl. ......................... 429/137; 429/232; 29/623.5
[58] Field of Search .................. 427/215; 29/623.5; 429/137, 232

[56] References Cited

U.S. PATENT DOCUMENTS

| | | | |
|---|---|---|---|
| 3,522,078 | 7/1970 | May et al. | 427/215 |
| 4,465,747 | 8/1984 | Evans | 429/194 |
| 4,977,024 | 12/1990 | Morita et al. | 427/215 X |
| 5,277,995 | 1/1994 | Ruka et al. | 29/623.5 X |
| 5,292,601 | 3/1994 | Sugeno et al. | 429/232 X |

FOREIGN PATENT DOCUMENTS 7-192720  7/1995  Japan .................. H01M 4/02

*Primary Examiner*—Stephen Kalafut
*Attorney, Agent, or Firm*—Lionel N. White; Joseph Giordano

[57] ABSTRACT

A rechargeable lithiated intercalation battery cell having reduced self-discharge comprises a negative electrode, a nonaqueous electrolyte, and a positive electrode wherein the surfaces of the aggregate lithiated intercalation composition particulates comprising the positive cell electrode have been coated with a passivating layer of a composition comprising a borate, lithiated borate, aluminate, lithiated aluminate, silicate, lithiated silicate, or mixtures thereof.

11 Claims, 5 Drawing Sheets

RECHARGEABLE BATTERY CELL HAVING SURFACE-TREATED LITHIATED INTERCALATION POSITIVE ELECTRODE

BACKGROUND OF THE INVENTION

This invention relates to a rechargeable lithiated intercalation battery cell comprising a negative electrode, a non-aqueous electrolyte, and a positive electrode, and, particularly, to such a cell which exhibits a greatly reduced level of self-discharge by virtue of a surface-passivating treatment of the lithiated intercalation composition particulates comprising the positive electrode.

Recent advances in rechargeable electrolytic battery cell technology have provided cells in which lithium metal is replaced with a material capable of reversibly intercalating lithium ions, thereby providing a so-called "rocking chair" cell, or lithium-ion intercalation cell, in which lithium ions "rock" between the intercalation electrodes during the charging/recharging cycles. Such a lithium metal-free "rocking chair" cell may thus be viewed as comprising two lithium-ion-absorbing electrode "sponges" separated by a lithium-ion conducting electrolyte usually comprising a $Li^+$ salt dissolved in a non-aqueous solvent or mixture of such solvents. This type of cell has been described by various investigators, including Murphy et al., *J. Electrochem. Soc.*, 126, 349 (1979); Lazzari et al., *J. Electrochem. Soc.*, 127 773 (1980); Armand, in "Materials for Advanced Batteries," Murphy et al., eds., Plenum Press, New York, p. 145 (1980); and Guyomard et al., U.S. Pat. No. 5,192,629.

The output voltage of a Li-ion cell is determined by the difference between the electrochemical potential of Li within the two lithium sponges. Thus, to obtain a large output voltage and large energy values, one needs to employ as positive and negative electrodes lithium sponges that can intercalate lithium at high and low potential, respectively. Among the materials which can replace lithium metal as the negative electrode, carbon provides an advantageous compromise between a large specific capacity and reversible cycling behavior. Positive electrode materials suitable in such lithium-ion cells are the layered $LiCoO_2$ and $LiNiO_2$ intercalation compounds, and the three-dimensional spinel phase $Li_{1+x}Mn_2O_4$.

A common feature of rechargeable Li-ion cells based on these oxides as positive electrodes is that they deintercalate lithium ions at an average potential of 4 V, and, therefore, must be charged up to voltages greater than 4 V so as to utilize their full capacity. An inherent problem with this lithium ion technology is related to the use of highly oxidizing positive electrodes and their high charging voltages, namely, the risk of self-discharge. This self-discharge phenomenon, attributed in part to catalyzed electrolyte decomposition by Guyomard et al., *Journal of Power Sources*, 54, 92 (1995), can, even at low levels, jeopardize cycle life and capacity, as well as the safety of the cells.

Attempts to control the deleterious electrolyte decomposition, such as by elevating decomposition reaction threshold temperatures, as suggested in Japanese Application No. 7-192720, or by neutralizing acidic impurities, as in U.S. Pat. No. 4,465,747, have not, however, proven significantly successful. Therefore, there remained a need in the industry for a rechargeable, lithium intercalation battery cell which is resistant to self-discharge, even at elevated temperatures up to about 55° C.

SUMMARY OF THE INVENTION

An object of the present invention is to provide a novel lithium intercalation cell having an improved reduction in self-discharge. Another object of the present invention is to provide a novel lithium intercalation cell having an improved reduction in self-discharge upon storage at temperatures up to about 55° C.

These objects, among others, have been achieved in the present invention by means of a novel lithium intercalation cell in which the surfaces of aggregate lithiated intercalation composition particulates comprising the positive cell electrode have been passivated by coating or encapsulation in a layer of a composition comprising a borate, lithiated borate, aluminate, lithiated aluminate, silicate, or lithiated silicate. Such a coating not only reduces the surface area, and thus the degree of activity, of the potentially catalytic particulate aggregates, but also provides a barrier layer which, while limiting contact between the electrolyte and the positive electrode particulates, does not seriously deter the passage of $Li^+$ ions.

In a preferred embodiment of the present invention, the surfaces of these particulates are coated with a layer of a composition comprising boron oxide, boric acid, lithium hydroxide, aluminum oxide, lithium aluminate, lithium metaborate, silicon dioxide, lithium silicate, or mixtures thereof. In another embodiment of the present invention, the coating of the surfaces of these particulates with a selected composition is effected by annealing at a temperature in excess of about 400° C., preferably in the range of about 500° C. to 800° C., to fuse the composition and allow it to flow and evenly coat the particulates.

BRIEF DESCRIPTION OF THE DRAWING

The present invention will be described with reference to the accompanying drawing of which.

DESCRIPTION OF THE INVENTION

Rechargeable Li-ion battery cells of the present invention are preferably of the type generally described in U.S. Pat. No. 5,460,904, the disclosure of which is incorporated herein by reference. Such a battery cell comprises a unitary laminate of a positive electrode composition layer with an associated current collector member, an intermediate separator layer having incorporated therein a non-aqueous electrolyte, and a negative electrode composition layer with an associated current collector member. When initially assembled for lamination, the battery structure components typically include: as the positive electrode layer, a 300 μm thick film of 6 parts of carbon black and 56 parts by weight of a Li-ion intercalation compound, such as a $Li_xMn_2O_4$, wherein $0<x<2$, which has been treated according to the present invention to provide aggregative particulate coating, intimately dispersed in a binder matrix of 16 parts of an 88:12 vinylidene fluoride:hexafluoropropylene (PVdF:HFP) copolymer plasticized with 16 parts of dibutylphthalate (DBP); as the separator layer, an 85 μm thick film of 20 parts of colloidal silica intimately dispersed in 30 parts of the copolymer plasticized with 50 parts of DBP; and as the negative electrode layer, a 200 μm thick film of 56 parts of microbead coke and 3 parts of carbon black intimately dispersed in 15 parts of the copolymer plasticized with 23 parts of DBP.

After lamination, a completed battery cell may be processed as described in the noted patent by immersion in methanol to extract substantially all the DBP plasticizer from the electrode and separator matrix compositions. Subsequent activation of the cell, in the described manner, by immersion in an electrolyte solution of 1M $LiPF_6$ in an equipart mixture of ethylene carbonate (EC) and dimethyl carbonate (DMC) prepares the cell for charge/discharge cycling.

Self-discharge of prior art charged secondary battery cells of this type during storage, particularly at temperatures in the range of about 55° C. or greater, appears to arise from the decomposition of the cell electrolyte which, in turn, is promoted by the catalytic action of the intercalation compound electrode component, e.g., $LiMn_2O_4$. This deleterious activity within a rechargeable battery cell is believed to proceed as:

(1) Electrolyte→Electrolyte$^+$+e$^-$ (Irreversible)

(2) $Mn_2O_4$+e$^-$+Li$^+$→$Li_xMn_2O_4$ (Reversible) in which the latter reaction results in an immediate, yet recoverable, loss in available cell output, or capacity, while the former reaction, resulting in electrolyte decomposition, leads to permanent loss in cell capacity.

Figure 1:
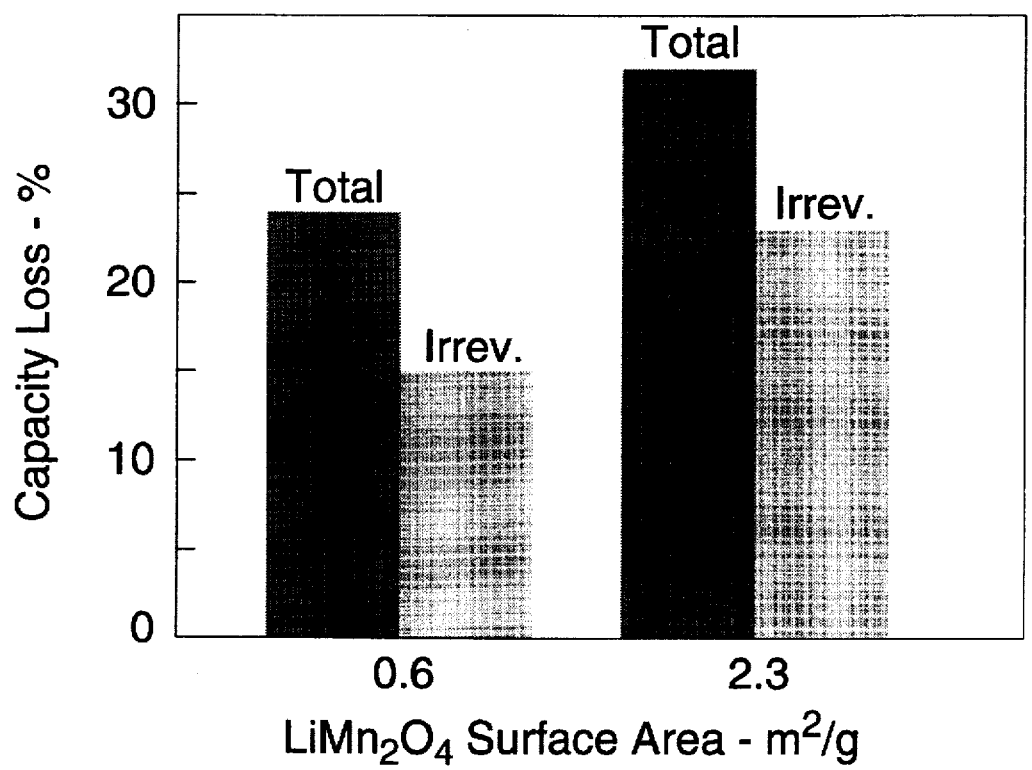
FIG. 1 is a chart depicting total and irreversible portions of the self-discharge of battery cells during storage at 55° C. as a function of the surface area density of $LiMn_2O_4$ electrode material.
Figure 2:
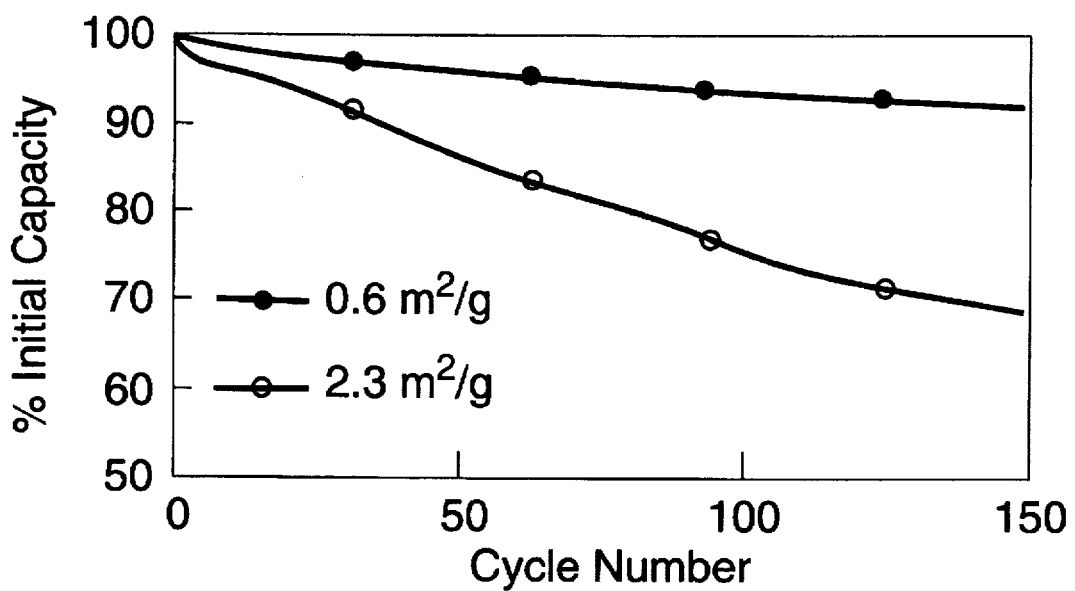
FIG. 2 is a graph depicting loss of initial capacity as a function of the number of charge/discharge cycles for cells having differing $LiMn_2O_4$ electrode surface area density.

The hypothesized catalysis of the irreversible electrolyte decomposition reaction by the positive electrode intercalation compound, such as $LiMn_2O_4$, gains support from the fact that, as is typical of surface-dependent catalytic reactions, the irreversible loss of cell capacity varies as a function of the surface area density of the aggregate particulates of that compound. This activity may be seen in FIGS. 1 and 2 which depict the greater total and irreversible capacity losses during charged storage at about 55° C., as well as the greater overall capacity loss over multiple charge/discharge cycles, exhibited by a cell having greater $LiMn_2O_4$ electrode material surface area, i.e., smaller material particle size.

It is apparent, therefore, that a significant factor in lessening the extent of self-discharge and irreversible loss of capacity in rechargeable Li-ion battery cells is the limitation of the active surface area of the highly oxidizing positive electrode material, such as $LiMn_2O_4$. Since such surface area is influenced by both particulate size and the surface morphology, it is an objective of the present invention to effect control of these two parameters of the material.

An initial approach to reducing the surface area density of $LiMn_2O_4$, for example, has been in the synthesis of the compound through the use of $Li_2CO_3$ and LiOH reactants, in preference to $LiNO_3$, since there are thus obtained $LiMn_2O_4$ powders of larger particle size having a surface area, as determined by common BET analysis, in the range of 0.2 m$^2$/g to 0.8 m$^2$/g, as compared with the 3.6 m$^2$/g surface area powders obtained with $LiNO_3$. Although somewhat successful, this expedient, even when supplemented with screening to remove a significant proportion of finer particles, did not sufficiently alleviate battery cell self-discharge and irreversible capacity loss.

Adjustment of the surface morphology of the intercalation compound has therefore been addressed as a means of minimizing the area of its surface contact with cell electrolyte, since scanning electromicrograph (SEM) examination of $LiMn_2O_4$ particles clearly reveals the presence of a rough surface, likely resulting from solid state aggregation of fine particulates. In pursuing this approach it has been discovered that the active catalytic area of electrolyte/electrode interface may be significantly restricted by coating the surface of the $LiMn_2O_4$ particles with a thin film of a material which decreases contact of the electrolyte with the surface of the $LiMn_2O_4$, while allowing for diffusion of lithium ions to the electrode composition.

Suitable materials for such a coating film have been found to be materials, occurring either in a crystalline or glassy form, which are satisfactory Li-ion conductors, such as borates or aluminates. Borate and lithiated borate glasses are particularly suitable for this purpose, since, in addition to their good Li-ion conductivity, they are readily prepared from inexpensive precursors and at temperatures which are compatible with the synthesis and processing of $LiMn_2O_4$, as well as being resistant to oxidation and able to wet the surface of ceramic oxides, such as $LiMn_2O_4$. Specifically, the coating film or layer may be prepared by annealing on the surface of the $LiMn_2O_4$ particles, at a temperature in excess of about 400° C., a composition comprising boron oxide, boric acid, lithium hydroxide, aluminum oxide, lithium aluminate, lithium metaborate, silicon dioxide, lithium silicate, or mixtures thereof.

EXAMPLE 1

In order to test the utility of this approach, a $LiMn_2O_4$ powder was prepared by annealing $Li_2CO_3$ and $MnO_2$ precursors according to the procedure described in U.S. Pat. No. 5,425,932. The resulting intercalation compound was used in this and the other examples of this specification. A measure of the $LiMn_2O_4$ powder was intimately mixed by grinding with about 1% by weight of $H_3BO_3$ and the mixture was then briefly heated at about 800° C. to fuse the $H_3BO_3$ into an amorphous borate film which coated the surfaces of the $LiMn_2O_4$ particulates. The resulting material was readily comminuted to yield a fine powder which appeared, under SEM examination, to have lost its sharp particulate profile in favor of the smoother aggregate surface features of the borate barrier overcoating.

Figure 3:
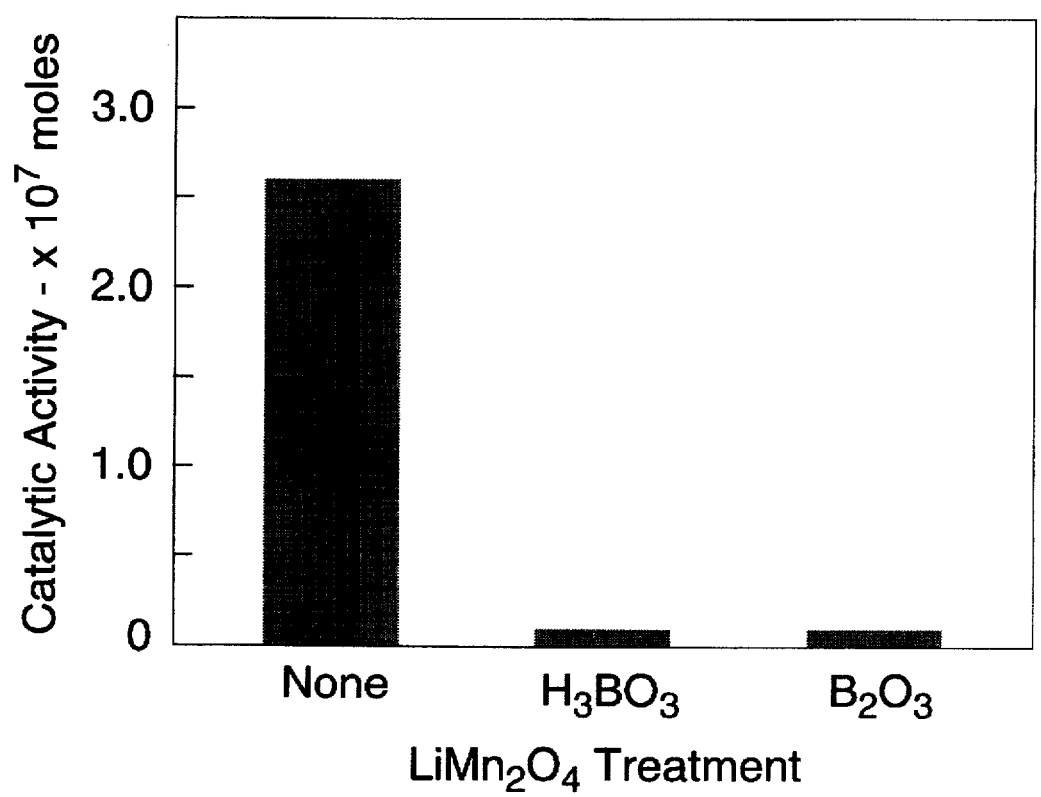
FIG. 3 is a chart depicting the catalytic activity of $LiMn_2O_4$ electrode composition, before and after treatment according to the present invention, as measured by catalytic conversion of CO to $CO_2$.
Figure 4:
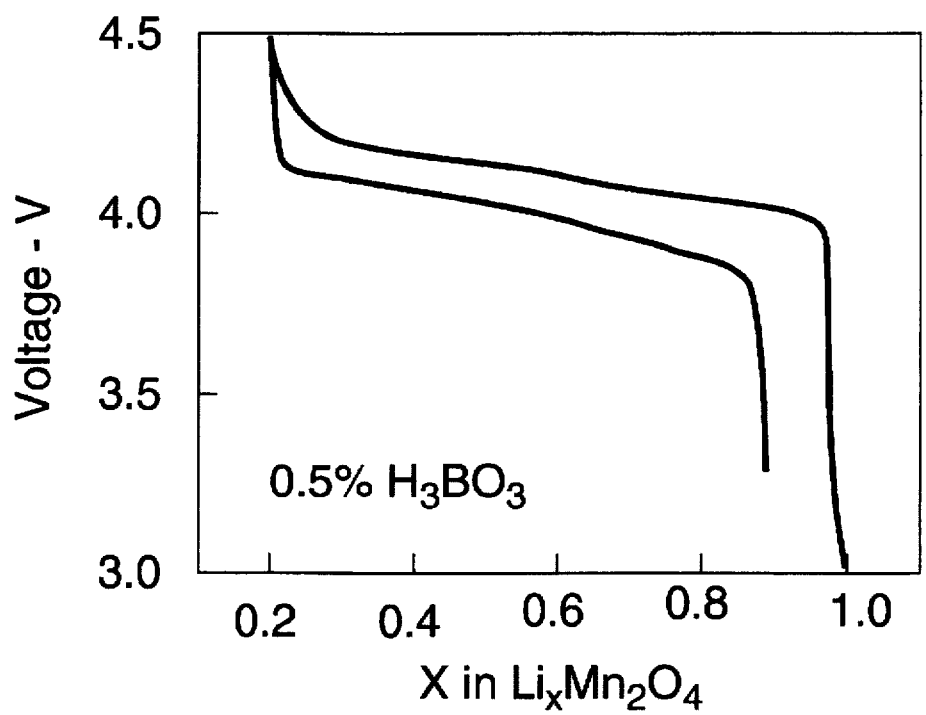
FIGS. 4–7 are graphs of the electrolytic performance of battery cells as represented by intercalated lithium as a function of charge/discharge voltage in $LiMn_2O_4$ positive electrodes having differing degrees of treatment according to the present invention.
Figure 5:
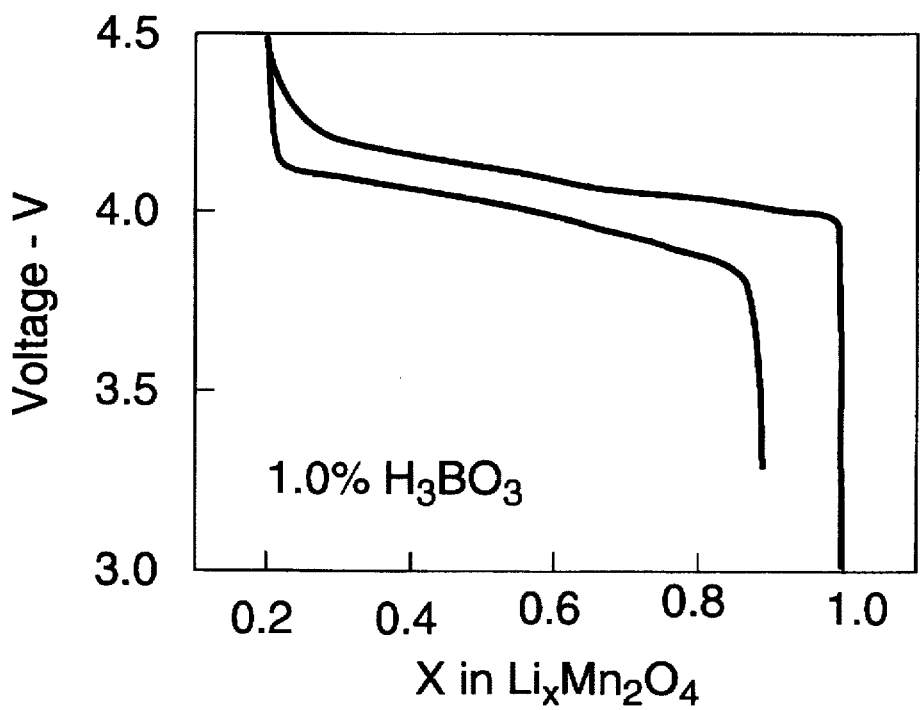
Figure 6:
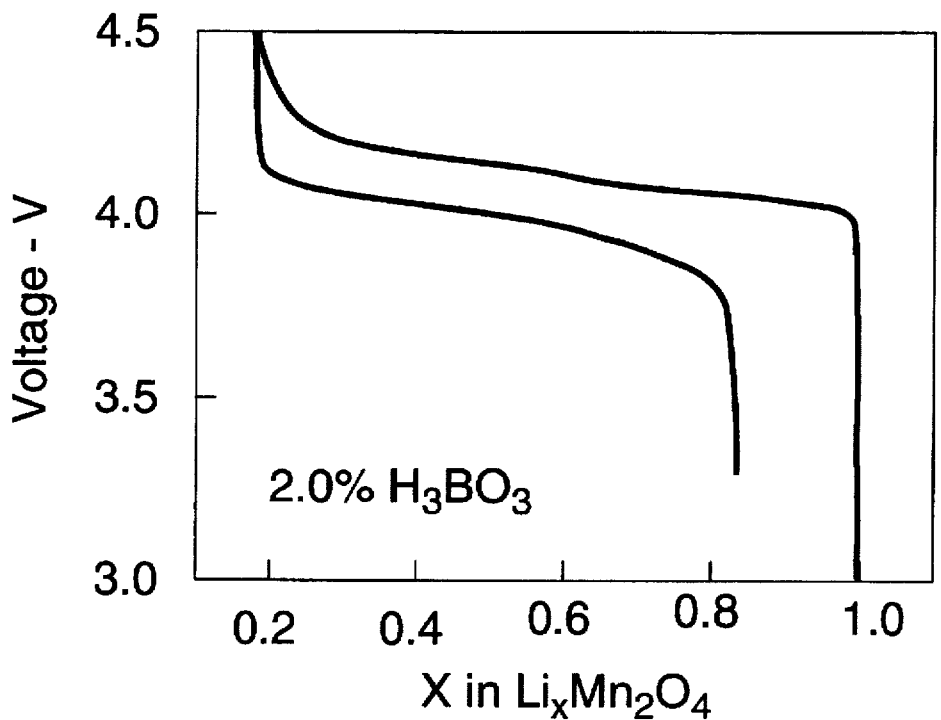
Figure 7:
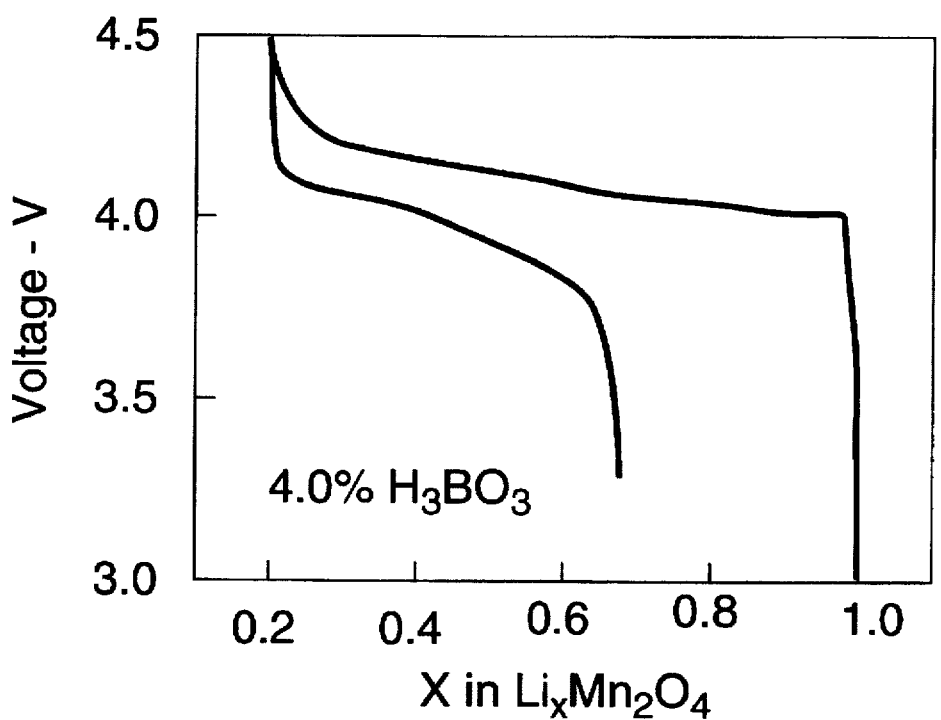

The efficacy of the borate coating in curtailing the normal catalytic action of $LiMn_2O_4$ was then tested by exposing the coated $LiMn_2O_4$ powder at about 450° C. to a 20 cm$^3$/min flow of $N_2$ containing 4% $O_2$ and 5% CO on the premise that the extent of oxidation of the CO to $CO_2$ in the reaction:

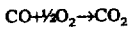

would provide an indication of the extent of catalysis by $LiMn_2O_4$. A similar test utilizing untreated $LiMn_2O_4$ powder provided a datum for the comparative evaluation. The results of these tests indicated that, indeed, the borate barrier coat treatment according to the invention decreased the generation of $CO_2$, and thus the catalytic activity of the $LiMn_2O_4$, by about 95%. A repeat of the treatment procedure utilizing $B_2O_3$ produced substantially similar results, all of which are depicted in FIG. 3 with reference to moles of $CO_2$ generated in the test.

Limitation of the catalytic action of a treated electrode compound on the oxidation of electrolyte did not alone establish that such a material could be effectively employed in a Li-ion battery cell, however. For this purpose, the electrolytic function of the electrode material, particularly in its support of the flow of Li$^+$ ions, must continue, uninhibited by the barrier effect of the borate coating. Efficacy of treated LiMn$_2$O$_4$ as a component of positive battery cell electrode compositions was therefore tested.

EXAMPLE 2

Portions of LiMn$_2$O$_4$ powder were treated as in Example 1 with varying amounts of H$_3$BO$_3$, namely, 0.5%, 1.0%, 2.0%, and 4.0% by weight, respectively, relative to the amount of LiMn$_2$O$_4$. The treated LiMn$_2$O$_4$ powders were then used, in typical formulations earlier-noted with respect to U.S. Pat. No. 5,460,904, to prepare rechargeable Li-ion intercalation battery test cells. These cells were then subjected to charge/discharge cycling over the range of 3 V to 4.5 V at a constant 10 mA as described in that patent and their electrolytic performance over the first cycle was plotted as shown in FIGS. 4–7. The exhibited degree of irreversible capacity loss during this cycle indicated, on the basis of past performance experience, that practical battery cells wouldbe limited to the use of electrode material treated with less than about 2% borate compound, with the range of about 0.6% to 1% being generally preferred.

To further ensure acceptable Li$^+$ ion conductivity through the barrier coating of treated intercalation compound electrode material, lithiated treatment compounds were examined.

EXAMPLE 3

A mixture of equimolar amounts of B$_2$O$_3$ and LiOH·H$_2$O was ball-milled for about 90 hours to obtain a fine lithiated borate powder which was used, in proportions of 0.4%, 0.6%, 0.8%, and 1.0% by weight, respectively, to surface-treat portions of LiMn$_2$O$_4$ powder, as described in Example 1. BET analysis of the treated materials indicated a significant decrease in surface area density, e.g., from about 0.8 m$^2$/g to 0.2 m$^2$/g for the 1% treated LiMn$_2$O$_4$.

Figure 8:
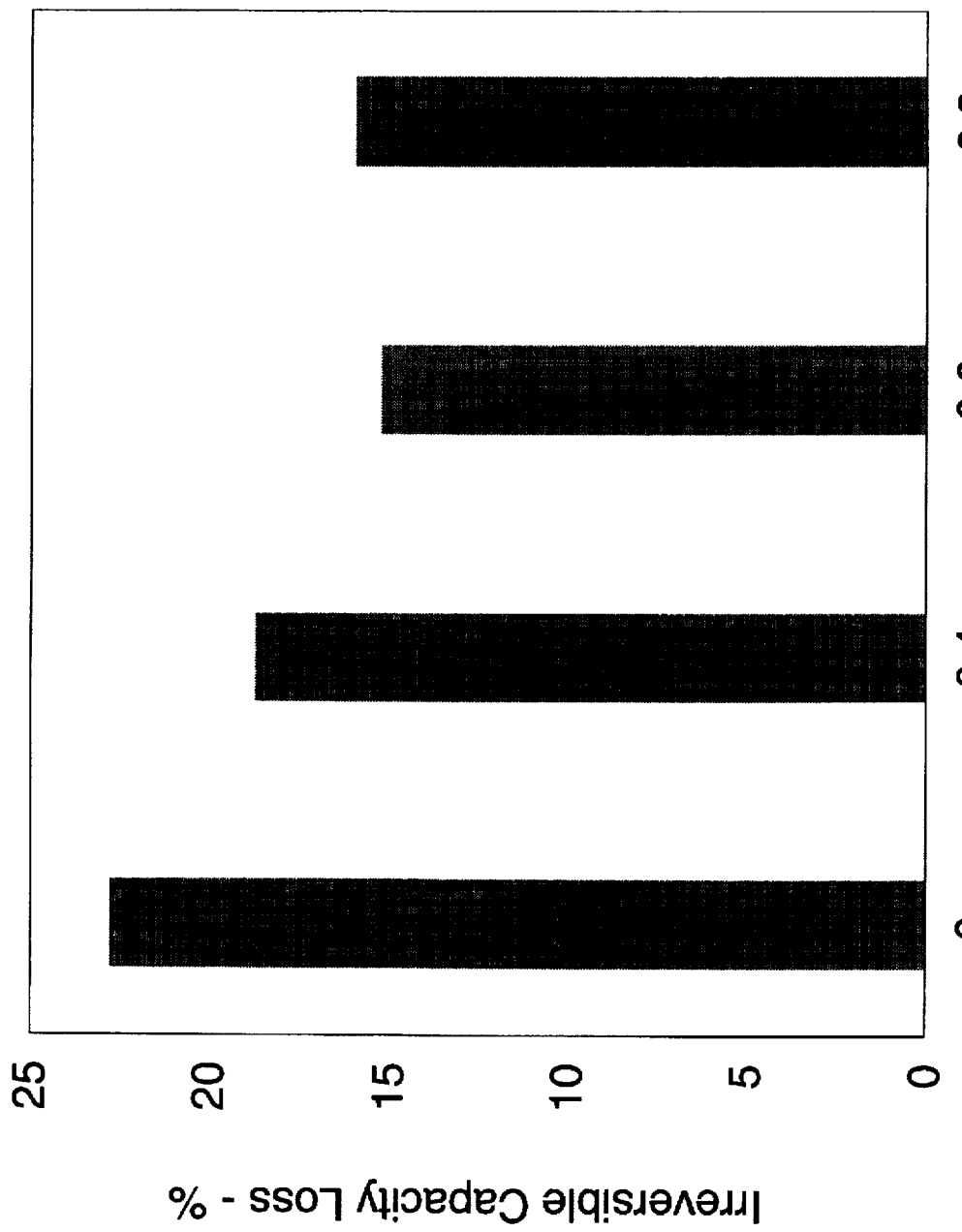
FIG. 8 is a chart of the comparative irreversible capacity loss of battery cells comprising $LiMn_2O_4$ positive electrodes having differing degrees of treatment according to the present invention.

Test cells were prepared with each of the treated materials as described in Example 2. These cells were then similarly subjected to five charge/discharge cycles at room temperature and, after a final charging, were stored at 55° C. for one week. After that period, the cells were discharged completely and then recharged one final time to provide data from which were calculated the irreversible component of the battery cell self-discharge suffered by the test cells during storage. These results are depicted in FIG. 8 and indicate that the preferred amount of a lithiated treatment compound continues to lie within the range of about 0.6% to 1.0%.

EXAMPLE 4

As an alternative expedient to the physical grinding used to intimately combine the intercalation and treatment compounds in the foregoing examples, 125 mg of H$_3$BO$_3$ was dissolved at a temperature of about 60° C. in 50 mL of acetone in a closed vessel and the solution was stirred to dryness with 12 g of LiMn$_2$O$_4$ powder in a mortar. The resulting mixture of LiMn$_2$O$_4$ with 1% borate composition was then heated to form the barrier coated electrode material which was tested as in the earlier examples with substantially similar results.

It is expected that other embodiments of the present invention will become apparent to those skilled in the art, and such embodiments are nonetheless intended to be within the scope of the invention as defined in the appended claims.

What is claimed is:

1. A rechargeable lithiated intercalation cell having reduced self-discharge, comprising a negative electrode, a nonaqueous electrolyte, and a positive electrode, wherein the positive electrode comprises an aggregate of lithiated intercalation compound particulates, the surfaces of which particulates are coated with a passivating layer comprising an annealed coating composition comprising boron oxide, boric acid, lithium hydroxide, aluminum oxide, lithium aluminate, lithium metaborate, silicon dioxide, lithium silicate, or mixtures thereof.

2. The rechargeable lithiated intercalation cell having reduced self-discharge according to claim 1, wherein said coated passivating layer is prepared by annealing said coating composition at a temperature in excess of 400° C.

3. The rechargeable lithiated intercalation cell having reduced self-discharge according to claim 1, wherein said coating composition is present in an amount of about 0.4% to 0.8% by weight relative to the amount of the lithiated intercalation compound.

4. The rechargeable lithiated intercalation cell having reduced self-discharge according to claim 3, wherein said coating composition is present in an amount of about 0.6% by weight relative to the amount of the lithiated intercalation compound.

5. The rechargeable lithiated intercalation cell having reduced self-discharge according to claim 1, wherein said lithiated intercalation electrode comprises Li$_x$Mn$_2$O$_4$, where 0<x<2.

6. A rechargeable battery cell comprising a negative electrode, a positive electrode, and an intermediate nonaqueous electrolyte characterized in that said positive electrode comprises a particulate lithium intercalation compound the particles of which are coated with a passivating layer comprising an annealed coating composition comprising boron oxide, boric acid, lithium hydroxide, aluminum oxide, lithium aluminate, lithium metaborate, silicon dioxide, lithium silicate, or mixtures thereof.

7. A rechargeable battery cell according to claim 6 characterized in that said passivating layer comprises a product resulting from the heat fusion of a composition comprising boron oxide, boric acid, lithium hydroxide, aluminum oxide, lithium aluminate, lithium metaborate, silicon dioxide, lithium silicate, or mixtures thereof.

8. A method of making a rechargeable battery cell comprising a negative electrode, a positive electrode, and an intermediate non-aqueous electrolyte, which method comprises forming said positive electrode of a composition comprising a particulate lithium intercalation compound characterized in that a) said particulate lithium intercalation compound is intimately mixed with a finely-divided composition comprising boron oxide, boric acid, lithium hydroxide, aluminum oxide, lithium aluminate, lithium metaborate, silicon dioxide, lithium silicate, or mixtures thereof; and b) said intimate mixture is heated to a temperature sufficient to fuse said finely-divided composition and allow it to flow and evenly coat the particulates of said lithium intercalation compound.

9. A method according to claim 8 wherein said mixture heated to a temperature in the range of about 500° C. to 800° C.

10. A method according to claim 8 wherein said finely-divided composition is mixed with said particulate lithium intercalation compound in a proportion up to about 2% by weight.

11. A method according to claim 10 wherein said finely-divided composition is mixed with said particulate lithium intercalation compound in a proportion in the range of about 0.6% to 1% by weight.

* * * * *